(12) United States Patent
Owens et al.

(10) Patent No.: US 8,545,747 B2
(45) Date of Patent: Oct. 1, 2013

(54) METHOD OF FORMING A PART WITH A FEATURE HAVING A DIE-LOCKED GEOMETRY

(75) Inventors: John N. Owens, Franklin, MI (US); Ingrid A. Rousseau, Clinton Township, MI (US); Elisabeth J. Berger, Farmington Hills, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 848 days.

(21) Appl. No.: 12/273,903

(22) Filed: Nov. 19, 2008

(65) Prior Publication Data

US 2010/0123270 A1    May 20, 2010

(51) Int. Cl.
*B28B 7/30*    (2006.01)
(52) U.S. Cl.
USPC ........... 264/313; 264/318; 264/319; 264/325; 264/346; 264/348; 264/230; 264/320; 425/438; 425/DIG. 58
(58) Field of Classification Search
USPC .................. 425/DIG. 58, 438; 249/127, 183, 249/184; 264/318, 319, 325, 346, 348, 230, 264/320, 313
See application file for complete search history.

(56) References Cited

U.S. PATENT DOCUMENTS

| | | |
|---|---|---|
| 7,188,498 B2 | 3/2007 | Browne et al. |
| 2004/0117955 A1 * | 6/2004 | Barvosa-Carter et al. ...... 24/442 |

FOREIGN PATENT DOCUMENTS

JP    02274526 A   * 11/1990

* cited by examiner

*Primary Examiner* — Yogendra Gupta
*Assistant Examiner* — Ninh Le
(74) *Attorney, Agent, or Firm* — Dierker & Associates, P.C.

(57) ABSTRACT

A method of forming a part with a feature having a die-locked geometry is disclosed herein. A molding tool used in the method includes at least one die having a cavity defined in a surface thereof, and a protrusion formed in the cavity. The method includes disposing a shape memory polymer insert on the protrusion, where the shape memory polymer insert has i) the die-locked geometry as its temporary shape, and ii) a geometry that is removable from the die-locked geometry as its permanent shape. A material is established in the cavity such that at least a portion of the material conforms to the die-locked geometry, thereby forming the part having the feature with the at least one die-locked geometry.

18 Claims, 2 Drawing Sheets

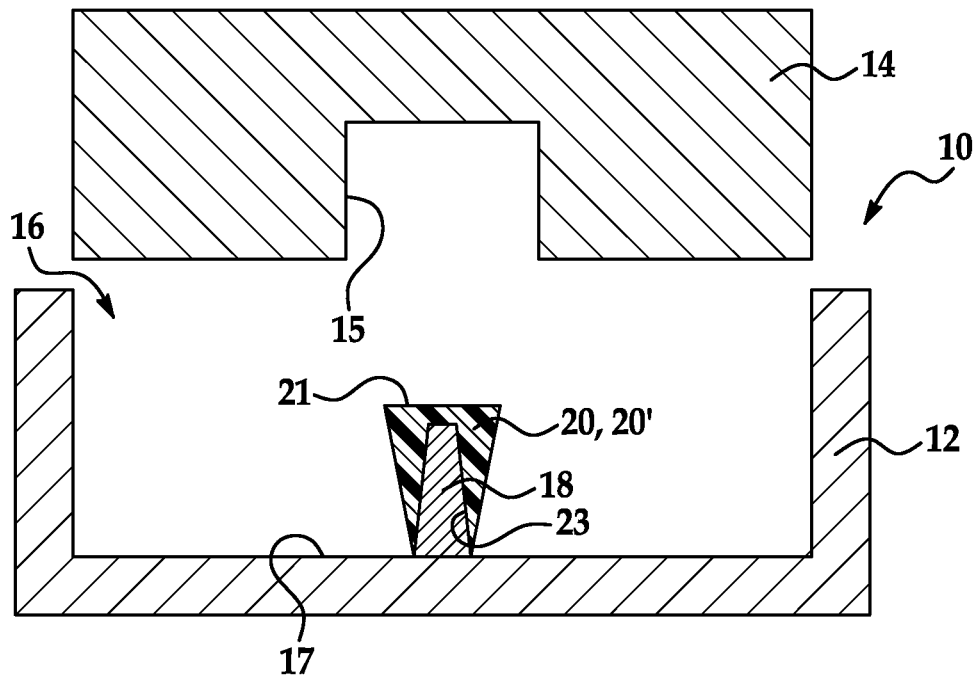
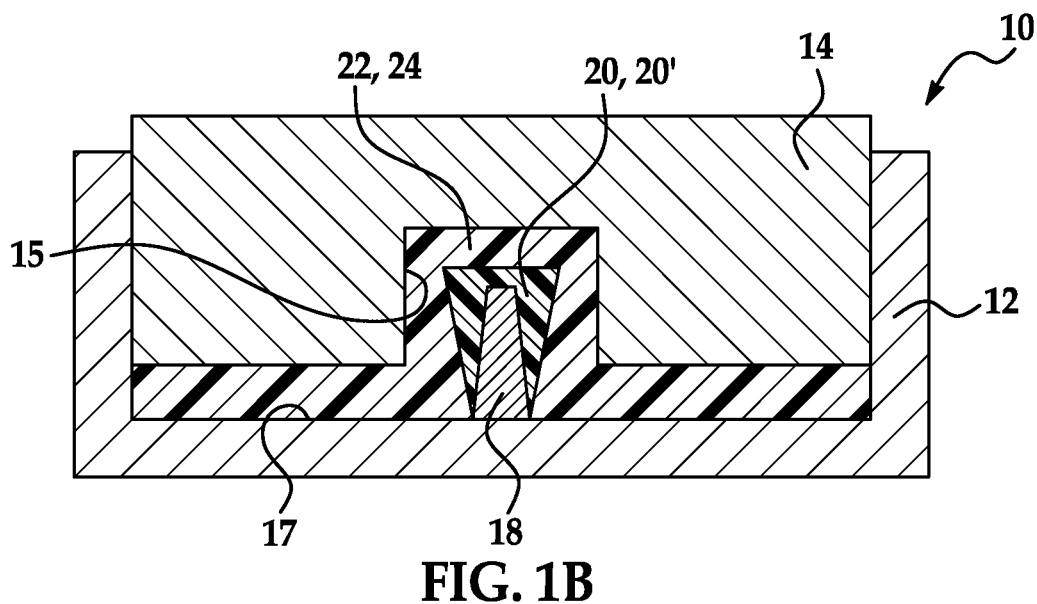
FIG. 1A
FIG. 1B

METHOD OF FORMING A PART WITH A FEATURE HAVING A DIE-LOCKED GEOMETRY

TECHNICAL FIELD

The present disclosure relates generally to methods of forming a part with a feature having a die-locked geometry.

BACKGROUND

Various automotive and/or aerospace parts including, for example, structural parts, internal cabin parts, and/or the like are often formed using conventional molding processes such as compression molding, injection molding, extrusion molding, blow molding, etc. The foregoing molding processes tend to be suitable for forming parts having relatively simple geometries, and in some instances, are suitable for molding parts having geometries with higher complexity. Molding more intricate parts (for example, parts that include one or more small intricate features) may, in some instances, be more difficult than molding parts with relatively simple geometries. Such small, intricate features may hinder or even prevent removal of the part from a molding tool once the component is formed. In these cases, additional removal procedures involving additional machinery and/or materials may be needed to remove the part from the molding tool, which may, in some instances, increase forming cost(s), time, and/or energy consumption.

SUMMARY

A method of forming a part with a feature having a die-locked geometry uses a molding tool including at least one die, a cavity defined in a surface of the at least one die, and a protrusion formed in the cavity. The protrusion is configured to enable part removal from the tool. The method includes disposing a shape memory polymer insert, in its temporary shape, on the protrusion. The shape memory polymer insert has i) the die-locked geometry as its temporary shape, and ii) a geometry that is removable from the die-locked geometry as its permanent shape. The method further includes establishing a material in the cavity such that at least a portion of the material conforms to the die-locked geometry, thereby forming the part having the feature with the die-locked geometry.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A through 1E together schematically depict an example of a method of forming a part with a feature having a die-locked geometry.

DETAILED DESCRIPTION

Example(s) of the method as disclosed herein may advantageously be used to form a part with a feature having a die-locked geometry. The method at least i) allows the part to be removed from a forming or molding tool without having to employ additional machinery and/or materials; ii) enables the formation of a number of differently shaped parts; and iii) allows the formation of the part with the feature having the die-locked geometry without having to employ alternative and/or additional molding techniques or processes.

As used herein, the term "die-locked" refers to a molding event where a part cannot be removed from a molding tool due, at least in part, to one or more features of the part being stuck in the mold. Accordingly, a "die-locked feature" or a "feature having die-locked geometry" is a feature of the part having a shape that prevents the part from being removed from the molding tool using conventional removal techniques. As a non-limiting example of this, a part including the die-locked feature cannot be removed from the molding tool where a die of the molding tool opens in only one direction.

Figure 1C:
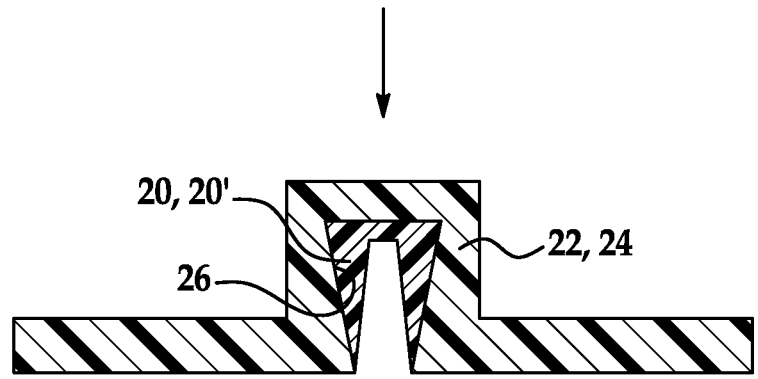
Figure 1D:
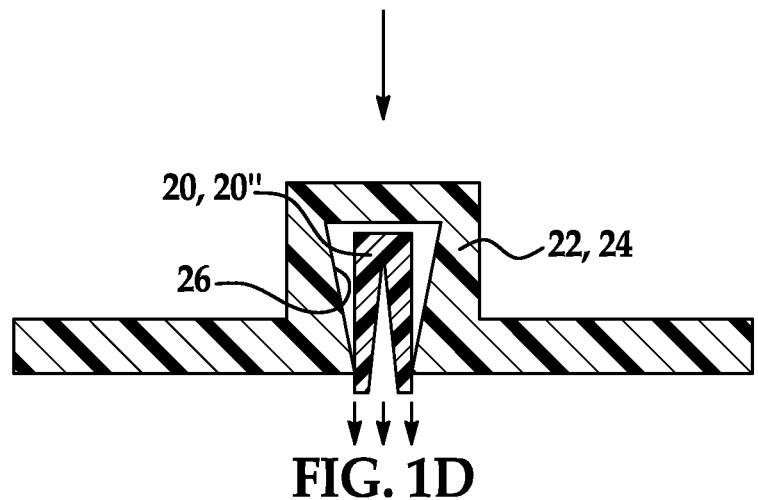
Figure 1E:
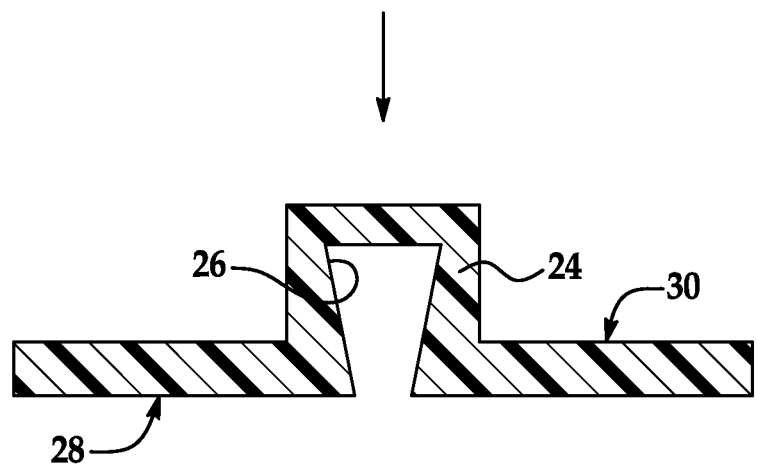

FIGS. 1A through 1E schematically depict an example of the method of forming a part 24 (as shown in FIG. 1E) with a feature 26 (also shown in FIG. 1E) having a die-locked geometry. The feature 26 of the part 24 formed by the example of the method depicted in FIGS. 1A through 1E is a dove-tail shaped recess formed into a side 28 (also shown in FIG. 1E) of the part 24. It is to be understood that the dove-tail shaped recess is one example of a feature 26 having a die-locked geometry, and that the features 26 disclosed herein may have other die-locked geometries. Other features include, but are not limited to, undercuts, protuberances, and the like. Other die-locked geometries include, but are not limited to, any shape having a larger diameter at an interior of the part to be formed than at a surface of the part to be formed, such as, for example, some triangular shapes, some trapezoidal shapes, a box having corrugations on at least five contacting surfaces but not on edges joining adjacent surfaces, or the like. It is to be understood that any shape that cannot be de-molded when the mold opens in a single direction is considered to be a die-locked geometry.

FIG. 1A schematically depicts an example of a molding tool 10 that may be used to form the part 24 with the feature 26 having the die-locked geometry. It is to be understood that the exemplary molding tool 10 depicted in FIG. 1A may be used for a compression molding process. It is further to be understood, however, that examples of the method of forming the part having the die-locked feature(s) may otherwise or additionally be formed using other molding processes, examples of which include liquid composite molding (e.g., for thermosets), injection molding, and/or the like, and/or combinations thereof.

Referring back to the example depicted in FIG. 1A, the molding tool 10 includes an upper die 14 having an upper die surface 15. It is to be understood that generally the upper die surface 15 has a shape that conforms to a desirable shape for the other side 30 (i.e., the side opposite to the side in which the feature 26 is formed, as shown in FIG. 1E) of the part 24. In the example shown in FIG. 1A, the upper die surface 15 has a recess formed therein. The entire shape of the surface 15 (including the recess) conforms to the desirable shape for the other side 30 (shown in FIG. 1E) of the part 24.

The molding tool 10 further includes a lower die 12 having a cavity 16 defined in surface 17 thereof. A protrusion 18 is formed in the cavity 16. In the example shown in FIG. 1A, the protrusion 18 is positioned normal to the lower die surface 17 and extends into the cavity 16. The protrusion 18 is generally configured to enable part 24 removal from the tool 10 (the process of which will be described in further detail below in conjunction with FIGS. 1B and 1C). This is accomplished by shaping the protrusion 18 such that angles, sides or other surfaces of the protrusion 18 enable part 24 removal. As such, the protrusion 18 has a non-die-locked geometry. Non-limiting examples of the protrusion 18 include those that have a cylindrical shape, a cone shape, a trapezoidal shape, a pyramidal shape, a cubic shape, a rectangular shape, and/or the like, and/or combinations thereof.

A shape memory polymer insert 20 is included in the molding tool 10 to enable molding of the part 24 including the die-locked feature 26, as well as removal of the part 24 from the tool 10. It is to be understood that the shape memory polymer insert 20 has two shapes: a permanent shape (referred to herein as 20" and shown in FIG. 1D) and a temporary shape (referred to herein as 20' and shown in FIGS. 1A through 1C). In the example set forth in FIGS. 1A through 1E, the permanent shape 20" of the shape memory polymer insert 20 is a shape that enables removal of the shape memory polymer insert 20 from the part 24 after molding (as will be described in further detail in conjunction with FIG. 1D). The temporary shape 20' of the shape memory polymer insert 20 is a shape that conforms to the shape of the side 28 of the part 24 including the die-locked feature 26 (i.e., the temporary shape 20' has the die-locked geometry).

In an example, the shape memory polymer insert 20 is converted from its permanent shape 20" into its temporary shape 20' and, while in its temporary shape 20', the shape memory polymer insert 20 is disposed on the protrusion 18 formed in the cavity 16 of the lower die surface 17. The shape memory polymer insert 20 in its temporary shape 20' is shown in FIG. 1A. Prior to disposing the shape memory polymer insert 20, 20' on the protrusion 18, the shape memory polymer insert 20 is converted from its permanent shape 20" into its temporary shape 20', and the temporary shape 20' is set in the die-locked geometry. Setting the temporary shape 20' may be accomplished by inserting the shape memory polymer insert 20 in its permanent shape 20" into an insert molding tool (not shown) having the geometry of the die-locked feature 26 (also referred to herein as the die-locked geometry). The shape memory polymer insert 20 is heated (either prior to or during closing of the insert mold) to a temperature above its switching temperature. At this temperature, the shape memory polymer insert 20 becomes deformable, and thus conforms to the geometry of the die-locked feature of the insert molding tool. As used herein, the "switching temperature" of the shape memory polymer refers to the temperature that causes the shape memory polymer to become deformable, and thus capable of being changed from its permanent shape into its temporary shape, or visa versa. It is to be understood that the switching temperature varies depending on the type of shape memory polymer selected for the insert 20. Non-limiting examples of suitable shape memory polymers include epoxy-based systems, acrylate-based systems, styrene-based systems, olefin-based systems, or combinations thereof. Any of the shape memory polymers disclosed herein may be reinforced with inorganic fillers or other active materials having switching temperatures greater than a curing temperature of a material 22 used to form the part 24 (as will be described in further detail below). In some instances, such material systems have switching temperatures ranging from about 100° C. to about 200° C. Non-limiting examples of suitable shape memory polymer fillers/fibers include electrically or magnetically conductive fillers/fibers, such as ferrite, magnetite, carbon fibers, carbon nanotubes, conductive polymers, etc.

During the molding (or re-molding described hereinbelow) of the insert 20, a force may be applied to the shape memory polymer insert 20 in order to conform the shape memory polymer into the desirable temporary shape 20'. It is to be understood that applying the force to the shape memory polymer insert 20 may be accomplished after heating the insert 20 above its switching temperature. It is further to be understood that the force applied is a predetermined mechanical force that will suitably deform the shape memory polymer insert 20 without damaging (e.g., breaking) it. In a non-limiting example, the force is provided by the closing of the insert molding tool.

The shape memory polymer insert 20, 20' is then cooled to a temperature below its switching temperature to fix the die-locked geometry as its temporary shape 20'. The shape memory polymer insert 20' is then removed from the insert molding tool. It is to be understood that the insert molding tool is configured such that the insert 20 in its temporary shape 20' is removable therefrom. In other words, the insert molding tool is configured so that the insert 20 is removable without having to shrink or otherwise distort the shape of the insert 20, 20'.

In the example of the method depicted in the figures, the temporary shape 20' of the shape memory polymer insert 20 includes an outer surface 21 that has the desirable die-locked geometry. The temporary shape 20' of the shape memory polymer insert 20 further includes an inner surface 23 that has the shape of the protrusion 18. It is to be understood that the outer surface 21 and the inner surface 23 of the temporary shape 20' of the insert 20 are determined by the shape of the feature 26 and the shape of the protrusion 18, respectively.

Referring now to FIG. 1B, a material 22 is established in the cavity 16. Non-limiting examples of the material 22 include thermoplastic materials (such as, for example, polyesters, polyolefins, and polyamides), thermoset materials (polyesters, urethanes, vinyl esters, cyanate esters, phenolics, bismaleimides, and epoxy resins), and composites including thermoplastic materials and thermoset materials. In an example, the material 22 may further include at least one of reinforcing fibers or reinforcing fillers, examples of which include carbon fibers, glass fibers, polyester fibers, carbon nanotubes, clay sheets or platelets, glass and/or ceramic particles, carbon black, and/or the like, and/or combinations thereof. In another example, the material 22 may further include plasters (e.g., Plaster of Paris) and/or modeling clays.

As also shown in FIG. 1B, the upper die 14 is drawn toward the lower die 12 such that the upper die surface 15 applies a force on the material 22 in the cavity 16. Upon application of such force, the material 22 conforms to the geometry of the lower die surface 17, the die-locked geometry of the shape memory polymer insert 20, 20', and to the shape of the upper die surface 15. If the material 22 requires heat for curing, in an embodiment, heat may also be applied to the material 22 as the upper die surface 15 applies the force thereon. The heat applied, if any, is sufficient to cure the material 22 into the part 24 including the feature 26 having the die-locked geometry. It is to be understood that the curing temperature for the material 22 is lower than the switching temperature of the shape memory polymer insert 20. For some materials 22, the curing temperature, in an example, ranges from about 100° C. to about 160° C., and, in another example, ranges from about 120° C. to about 130° C. For other materials 22, the curing temperature is room temperature. It is to be understood, however, that the curing temperature (if any) will depend upon the material 22 selected and, therefore, the material 22 may have a higher or lower curing temperature than the ranges recited herein. Utilizing a material 22 with a curing temperature lower than the shape memory polymer inset 20 switching temperature ensures that the insert 20, 20' will not prematurely or undesirably conform to the permanent shape 20" during curing. It is to be understood that the shape memory polymer insert 20 is configured to be substantially stable under all of the physical operating conditions of the tool 10 during formation of the part 24.

In another embodiment, the material 22 is heated prior to establishing the material 22 in the cavity 16, and cools while in the cavity 16. This embodiment may be used for, e.g., thermoplastic materials selected for the material 22.

After molding (and potentially curing) the material 22, thereby forming the part 24, the upper die 14 is retracted from the lower die 12 and the part 24 is removed from the tool 10. It is to be understood that when the part 24 is removed from the tool 10, the shape memory polymer insert 20, 20' is also removed. More specifically, the insert 20, 20' remains inside of the feature 26 having the die-locked geometry, as shown in FIG. 1C. As previously mentioned, since the protrusion 18 is configured to be readily removed from the insert 20, after the upper die 14 is retracted, the part 24 (including the insert 20) may be lifted out of the cavity 16 and off of the protrusion 18.

Referring now to FIG. 1D, the shape memory polymer insert 20 is removed from inside the die-locked feature 26 after the part 24 is removed from the tool 10. This is accomplished by converting the shape memory polymer insert 20 from its temporary shape 20' back into its permanent shape 20". In an embodiment, the shape memory polymer insert 20 is converted from the temporary shape 20' into its permanent shape 20" by activating the shape memory polymer insert 20 to trigger its deformation. Activating the shape memory polymer insert 20 may be accomplished, for example, by directly heating the shape memory polymer insert 20 to a temperature above its switching temperature. Another method for activating the shape memory polymer insert 20 may be applied for shape memory polymers having its switching temperature the same as its glass transition temperature. This particular activation method includes changing the relative humidity of the environment to which the shape memory polymer is exposed, or exposing the shape memory polymer to a solvent. Such exposures render the shape memory polymer deformable because absorbed water or solvent molecules act as a plasticizer, which causes the glass transition temperature to decrease. Accordingly, in such instances, the temperature of the ambient environment does not necessarily have to be increased in order to reach the switching temperature. In instances where the shape memory polymer insert 20 includes fibers or fillers, activating the shape memory polymer 20 may be accomplished by indirectly heating the shape memory polymer 20 by applying, to the shape memory polymer 20, an electrical and/or magnetic field, which causes heating of the fiber or filler through Joule heating or power losses of magnetically active particles. This, in turn, heats the shape memory polymer 20.

Once converted into its permanent shape 20", the shape memory polymer insert 20 may then be removed from inside the feature 26 of the part 24. The shrunken insert 20, 20" is pulled in the direction of the feature 26 opening, as indicated by the arrows in FIG. 1D. The molded or formed part 24 including the feature 26 with the die-locked geometry, and having the insert 20 removed therefrom, is shown in FIG. 1E.

As already stated above, the shape memory polymer insert 20 may be used to form a number of differently shaped parts. For example, after the part 24 is formed and the insert 20 is removed therefrom, the insert 20 may be re-molded (wherein the temporary shape 20' may be re-set) into another predetermined die-locked geometry. The predetermined die-locked geometry is, in this case, different from the die-locked geometry of the feature 26 just formed. Alternatively, it may be desirable to form another part having the same die-locked feature 26 as the part 24 just formed. In this case, the insert 20 may be re-molded to have the same die-locked geometry as the feature 26 of the part 24 just formed.

Re-molding the insert 20 may, in an example, be accomplished by inserting the shape memory polymer insert 20 (i.e., while in its permanent shape 20") into an insert molding tool having the predetermined die-locked geometry and configured to release the shape memory polymer insert 20, 20' therefrom. The shape memory polymer insert 20 is then heated to a temperature above its switching temperature (and, in some instances, a force is applied thereto, e.g., via the closure of the insert molding tool) to conform the shape memory polymer insert 20 to the die-locked geometry of the die-locked feature corresponding to the desirable temporary shape 20'. The shape memory polymer insert 20 having the predetermined die-locked geometry is fixed in its temporary shape 20' by cooling the shape memory polymer insert 20, 20' to a temperature below its switching temperature.

While several embodiments have been described in detail, it will be apparent to those skilled in the art that the disclosed embodiments may be modified. Therefore, the foregoing description is to be considered exemplary rather than limiting.

The invention claimed is:

1. A method of forming a part with a feature having a die-locked geometry, the method comprising:
   providing a molding tool, including:
      at least one die;
      a cavity defined in a surface of the at least one die; and
      a protrusion formed in the cavity and positioned normal to an inner surface of the at least one die, the protrusion configured to enable part removal from the tool;
   disposing a shape memory polymer insert, in its temporary shape, on the protrusion, the shape memory polymer insert having i) the die-locked geometry as its temporary shape, and ii) a geometry that is removable from the feature of the part as its permanent shape; and
   establishing a material in the cavity such that at least a portion of the material conforms to the die-locked geometry, thereby forming the part having the feature with the die-locked geometry.

2. The method as defined in claim 1 wherein the material is selected from thermoplastic materials, thermoset materials, or composites including thermoplastic materials and thermoset materials.

3. The method as defined in claim 2 wherein the material further includes at least one of reinforcing fibers or reinforcing fillers.

4. The method as defined in claim 1, further comprising:
   removing, from the tool, the part having the shape memory polymer insert inside the feature with the die-locked geometry;
   converting the shape memory polymer insert to its permanent shape; and
   removing the shape memory polymer insert in its permanent shape from the feature with the die-locked geometry.

5. The method as defined in claim 4 wherein converting the shape memory polymer insert to its permanent shape includes activating the shape memory polymer insert to initiate recovery of its permanent shape.

6. The method as defined in claim 5 wherein activating the shape memory polymer insert is accomplished by: directly heating the shape memory polymer insert above its switching temperature; changing a relative humidity of an environment to which the shape memory polymer is exposed; exposing the shape memory polymer to a predetermined solvent; or a combination thereof.

7. The method as defined in claim 5 wherein the shape memory polymer insert includes a conductive filler or a conductive fiber therein, and wherein activating the shape memory polymer insert is accomplished by: indirectly heating the filler or fiber by applying an electric field to the shape memory polymer, a magnetic field to the shape memory polymer, or a combination thereof.

8. The method as defined in claim 4 wherein after removing the shape memory polymer insert from the feature having the die-locked geometry, the method further comprises re-molding the shape memory polymer insert by:
   inserting the shape memory polymer insert, in its permanent shape, into an insert molding tool having a tool feature with a tool feature die-locked geometry;
   heating the shape memory polymer insert to a temperature above its transition temperature, thereby conforming the shape memory polymer insert to the tool feature die-locked geometry corresponding to the temporary shape; and
   cooling the shape memory polymer insert to a temperature below its transition temperature, thereby fixing the tool feature die-locked geometry as its temporary shape.

9. The method as defined in claim 8 wherein the tool feature die-locked geometry is the same as or different from the die-locked geometry of the feature of the part.

10. The method as defined in claim 1 wherein the protrusion has a cylindrical shape, a cone shape, a trapezoidal shape, a pyramidal shape, a cubic shape, a rectangular shape, or combinations thereof, and wherein any angles of the protrusion enable part removal from the tool.

11. The method as defined in claim 1 wherein prior to disposing the shape memory polymer insert, the method further comprises molding the shape memory polymer insert by:
   inserting the shape memory polymer insert, in its permanent shape, into an insert molding tool having a tool feature with a same die-locked geometry as the die-locked geometry of the feature of the part;
   heating the shape memory polymer insert to a temperature above its transition temperature, thereby conforming the shape memory polymer insert to the die-locked geometry corresponding to the temporary shape; and
   cooling the shape memory polymer insert to a temperature below its transition temperature, thereby fixing the die-locked geometry as its temporary shape.

12. The method as defined in claim 11, further comprising removing the shape memory polymer insert in its temporary shape from the insert molding tool.

13. The method as defined in claim 1 wherein the molding tool includes an upper die and a lower die, the lower die including the cavity defined in a surface thereof, and wherein establishing the material includes:
   depositing the material in the cavity;
   drawing the upper die toward the material in the cavity of the lower die; and
   curing the material in the cavity.

14. The method as defined in claim 1 wherein the shape memory polymer insert is substantially stable under physical operating conditions of the tool during the forming method.

15. The method as defined in claim 1 wherein establishing the material is accomplished via compression molding, liquid composite molding, injection molding, or combinations thereof.

16. A tool for forming a part with a feature having a die-locked geometry, the tool comprising:
   at least one die;
   a cavity defined in a surface of the at least one die;
   a protrusion formed in the cavity and positioned normal to an inner surface of the least one die, the protrusion configured to enable part removal from the tool; and
   a shape memory polymer insert, in its temporary shape, disposed on the protrusion, the shape memory polymer insert having i) the die-locked geometry as its temporary shape, and ii) a geometry that is removable from the part feature as its permanent shape.

17. The tool as defined in claim 16 wherein the protrusion has a cylindrical shape, a cone shape, a trapezoidal shape, a pyramidal shape, a cubic shape, a rectangular shape, or combinations thereof, and wherein any angles of the protrusion enable part removal from the tool.

18. The tool as defined in claim 16 wherein the at least one die includes an upper die and a lower die, the lower die having the cavity defined in a surface thereof, and wherein the upper die is configured to compress a molding material established in the cavity.

* * * * *